United States Patent
Pieknik et al.

(10) Patent No.: US 10,431,931 B2
(45) Date of Patent: Oct. 1, 2019

(54) ELECTRICAL UNIT AND ASSEMBLY

(71) Applicant: Lear Corporation, Southfield, MI (US)

(72) Inventors: Jared Pieknik, Westland, MI (US);
Parminder Brar, Windsor (CA);
Michael Scott Duco, Fraser, MI (US);
David Miller, Canton, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/867,462

(22) Filed: Jan. 10, 2018

(65) Prior Publication Data

US 2019/0214769 A1 Jul. 11, 2019

(51) Int. Cl.
*H01R 13/639* (2006.01)
*H01R 13/631* (2006.01)

(52) U.S. Cl.
CPC ....... *H01R 13/6395* (2013.01); *H01R 13/631* (2013.01); *H01R 13/6392* (2013.01)

(58) Field of Classification Search
CPC .............. H01R 13/6395; H01R 13/639; H01R 13/6397; H01R 13/748; H01R 13/447; H01R 13/5804; H01R 13/688; H01R 13/5816; H01R 13/627
See application file for complete search history.

(56) References Cited

U.S. PATENT DOCUMENTS

| | | | | |
|---|---|---|---|---|
| 2,659,059 A | * | 11/1953 | Johnson | H01R 13/6395 174/53 |
| 3,538,484 A | * | 11/1970 | Fassafiume | H01B 7/065 174/69 |
| 3,811,104 A | * | 5/1974 | Caldwell | H01R 13/6395 439/135 |
| 4,531,800 A | * | 7/1985 | Avener | H01R 13/625 439/147 |
| 5,348,495 A | * | 9/1994 | Kasden | H01R 13/6395 439/371 |
| 6,520,792 B2 | * | 2/2003 | Chen-Chiang | H01R 13/6395 439/373 |
| 7,140,903 B2 | * | 11/2006 | Pulizzi | H01R 13/5804 439/371 |

(Continued)

FOREIGN PATENT DOCUMENTS

| | | | | |
|---|---|---|---|---|
| CN | 106058575 A | * | 10/2016 | ........... H01R 13/639 |
| DE | 202014102609 U1 | | 9/2015 | |
| EP | 2672573 B1 | | 12/2016 | |

OTHER PUBLICATIONS

English Translation of Li (CN 106058575), Oct. 2016.*
Drawings of design publicly available or known more than one year prior to Jan. 10, 2018.

*Primary Examiner* — James Harvey
*Assistant Examiner* — Matthew T Dzierzynski
(74) *Attorney, Agent, or Firm* — Fishman Stewart PLLC

(57) ABSTRACT

An electrical unit includes a housing member, a slider configured to slide along an outer surface of the housing member and selectively retain an electrical connector relative to the housing member, and a bracket connected to the housing member. The bracket may restrict movement of the slider in at least one direction. The slider may include a collar and/or a leg. The leg may extend substantially perpendicularly from the collar. The electrical unit may include a second bracket. The housing member may include a first bracket recess and/or a second bracket recess.

19 Claims, 14 Drawing Sheets

(56) References Cited

U.S. PATENT DOCUMENTS

| | | | |
|---|---|---|---|
| 7,804,691 B1* | 9/2010 | Davis | H05K 5/0247 |
| | | | 361/752 |
| 7,927,126 B1* | 4/2011 | Bender | H01J 37/04 |
| | | | 439/369 |
| 7,985,098 B2 | 7/2011 | De Chazal et al. | |
| 8,029,308 B2* | 10/2011 | Saruwatari | H01R 13/6395 |
| | | | 439/373 |
| 8,221,165 B2 | 7/2012 | DeWitte | |
| 8,235,744 B1 | 8/2012 | Liptak et al. | |
| 8,360,804 B1* | 1/2013 | Meister | H01R 13/6395 |
| | | | 439/350 |
| 8,926,358 B2* | 1/2015 | Kuo | H01R 13/629 |
| | | | 439/367 |
| 8,986,040 B2* | 3/2015 | Garofalo | H01R 13/6397 |
| | | | 439/373 |
| 9,166,337 B2* | 10/2015 | Boswell | H01R 13/6395 |
| 9,197,018 B2* | 11/2015 | Garofalo | H01R 13/6395 |
| 9,379,488 B2* | 6/2016 | Schneider | G02B 6/3887 |
| 9,391,402 B2* | 7/2016 | Lin | H01R 9/18 |
| 9,509,096 B2 | 11/2016 | Zhao et al. | |
| 2014/0192457 A1 | 7/2014 | Zhao | |
| 2018/0366877 A1* | 12/2018 | Gassner | H01R 13/6395 |

* cited by examiner

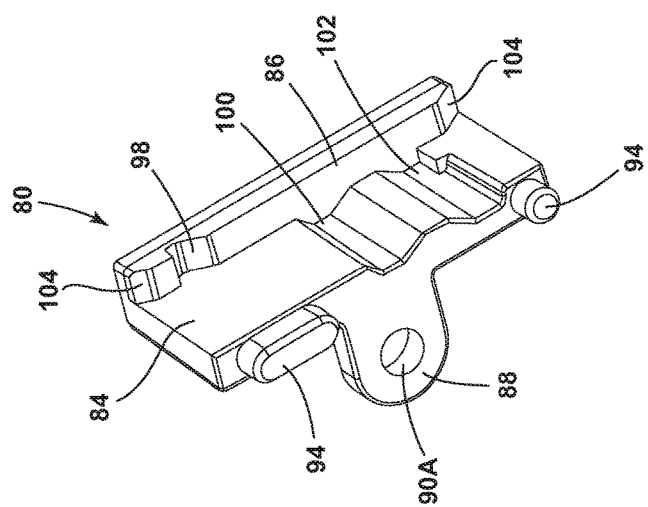
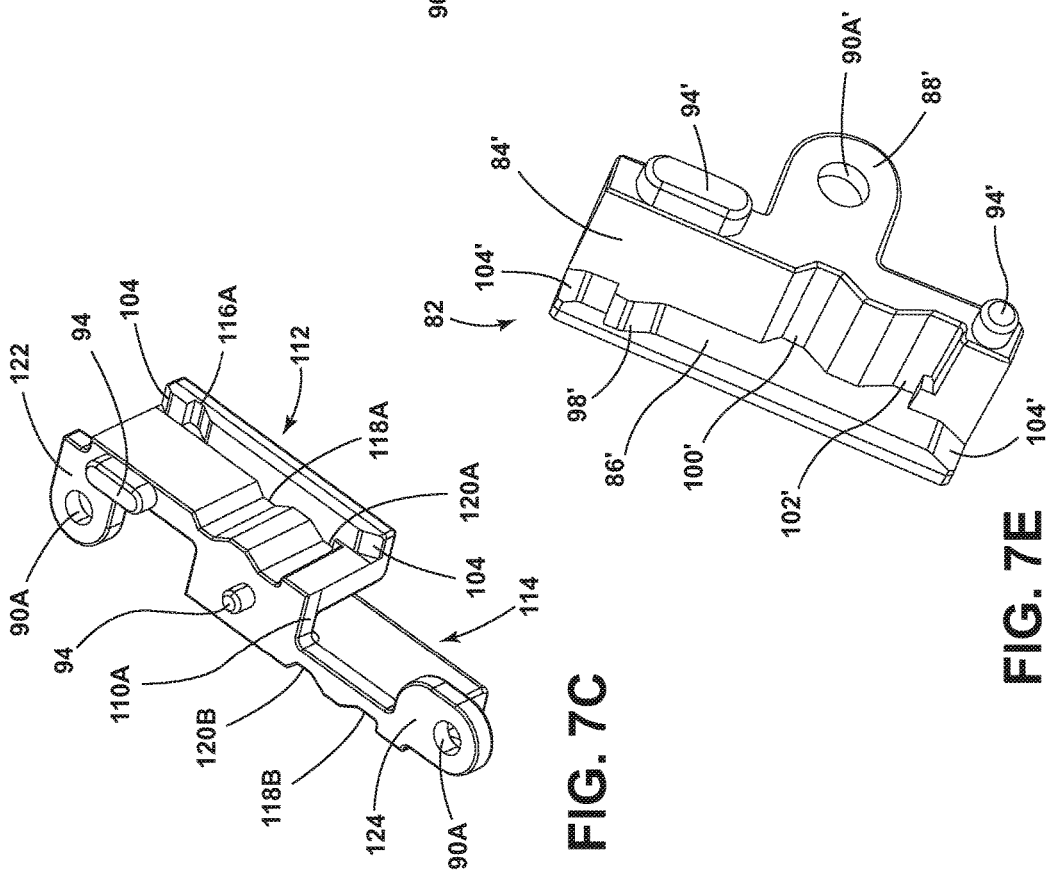

ELECTRICAL UNIT AND ASSEMBLY

TECHNICAL FIELD

The present disclosure generally relates to electrical units and electrical assemblies, including electrical units, electrical unit housings, and electrical connectors.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some electrical assemblies may be relatively complex to use and/or to assemble. For example, connecting an electrical connector with some electrical units may be a complex process and/or include many different components.

There is a desire for solutions/options that minimize or eliminate one or more challenges or shortcomings of electrical assemblies, electrical units, and/or electrical connectors. The foregoing discussion is intended only to illustrate examples of the present field and should not be taken as a disavowal of scope.

SUMMARY

The foregoing and other aspects, features, details, utilities, and/or advantages of embodiments of the present disclosure will be apparent from reading the following description, and from reviewing the accompanying drawings.

In embodiments, an electrical unit may comprise a housing member, a slider that may be configured to slide along an outer surface of the housing member and/or selectively retain an electrical connector relative to the housing member, and/or a bracket that may connect to the housing member. The bracket may restrict movement of the slider in at least one direction.

In embodiments, a slider may include a collar and/or a leg. A leg may extend substantially perpendicularly from the collar. An electrical unit may include a second bracket. A housing member may include a first bracket recess and/or a second bracket recess. A bracket may include a first protrusion and/or the second bracket may include a second protrusion. A first protrusion may be disposed at least partially in the first bracket recess, and/or the second protrusion may be disposed at least partially in the second bracket recess.

With embodiments, an electrical unit may include a flange that may be configured to engage at least a portion of the leg of the slider. An electrical unit may include a securing tab, which may include a recess or aperture. A housing member may include a guide track. A guide track may extend from the outer surface of the housing member substantially parallel to a leg of the slider.

In embodiments, the bracket may be configured to restrict movement of the slider. A leg of the slider may be in contact with the guide track and/or the outer surface of the housing member. A leg of the slider may include a slot or recess and/or at least a portion of the guide track may be disposed in the slot or recess.

With embodiments, a housing member may include a connector formation that may extend from the outer surface. A connector formation may be configured to engage at least a portion of said electrical connector. A housing member may include a guide track that may extend from the outer surface. A connector formation and/or the guide track may define or provide a channel that may be configured to at least partially receive the electrical connector. An electrical unit may include a terminal shroud that may be connected to an inner surface of the housing member.

In embodiments, an electrical unit may include a first connector formation which may extend from the outer surface of the housing member and/or may be configured to engage said electrical connector. An electrical unit may include a second slider that may be configured to slide along the outer surface of the housing member and/or may selectively retain a second electrical connector relative to the housing member. With embodiments, the electrical unit may include a second bracket that may be connected to the housing member. The bracket may restrict movement of the slider in at least one direction. The electrical unit may include a second connector formation which may extend from the outer surface of the housing member and may be configured to engage said second electrical connector. The first connector formation and/or the second connector formation may include a substantially common shape. The first connector formation and/or the second connector formation may be offset in a first direction and/or offset in a second direction.

In embodiments, an electrical assembly may comprise a housing member, a slider, a bracket that may be connected to the housing member, and/or an electrical connector which may be connected directly to the housing member via the slider. The bracket may restrict movement of the slider in at least one direction. The bracket may include a protrusion extending toward an outer surface of the housing member and/or the housing member may include a bracket aperture or recess. At least a portion of the protrusion may be disposed in the bracket aperture or recess. In embodiments, the bracket may include a tab and/or the bracket may be connected directly to the housing member via the tab.

With embodiments, a housing member may include a guide formation and a connector formation. The guide formation and the connector formation may define or provide a channel. The electrical connector may be disposed at least partially in the channel. An outer surface of the housing member may include a connector recess and/or at least a portion of the electrical connector may be disposed in the connector recess. In embodiments, an electrical assembly may include a fastener. An electrical connector may include a connector aperture and/or a housing member may include a housing member aperture or recess. With embodiments, a fastener may be disposed at least partially in the connector aperture and/or in the housing member aperture or recess.

BRIEF DESCRIPTION OF THE DRAWINGS

FIG. 7C is a perspective view generally illustrating portions of an embodiment of a bracket according to teachings of the present disclosure.

FIG. 7D is a perspective view generally illustrating portions of an embodiment of a bracket according to teachings of the present disclosure.

FIG. 7E is a perspective view generally illustrating portions of an embodiment of a bracket according to teachings of the present disclosure.

DETAILED DESCRIPTION

Figure 1:
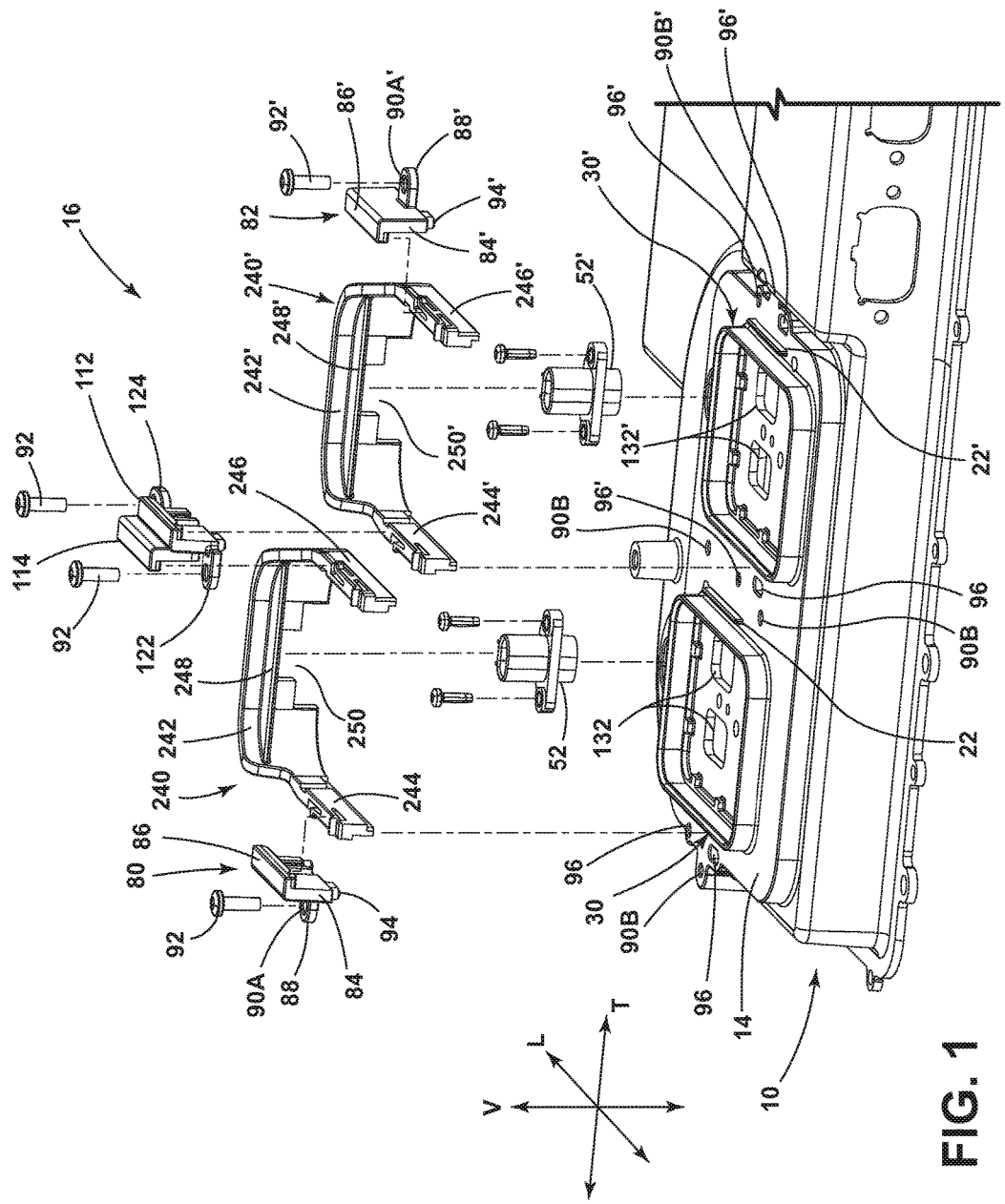
FIG. 1 is an exploded perspective view generally illustrating an embodiment of an electrical unit according to teachings of the present disclosure.
Figure 2:
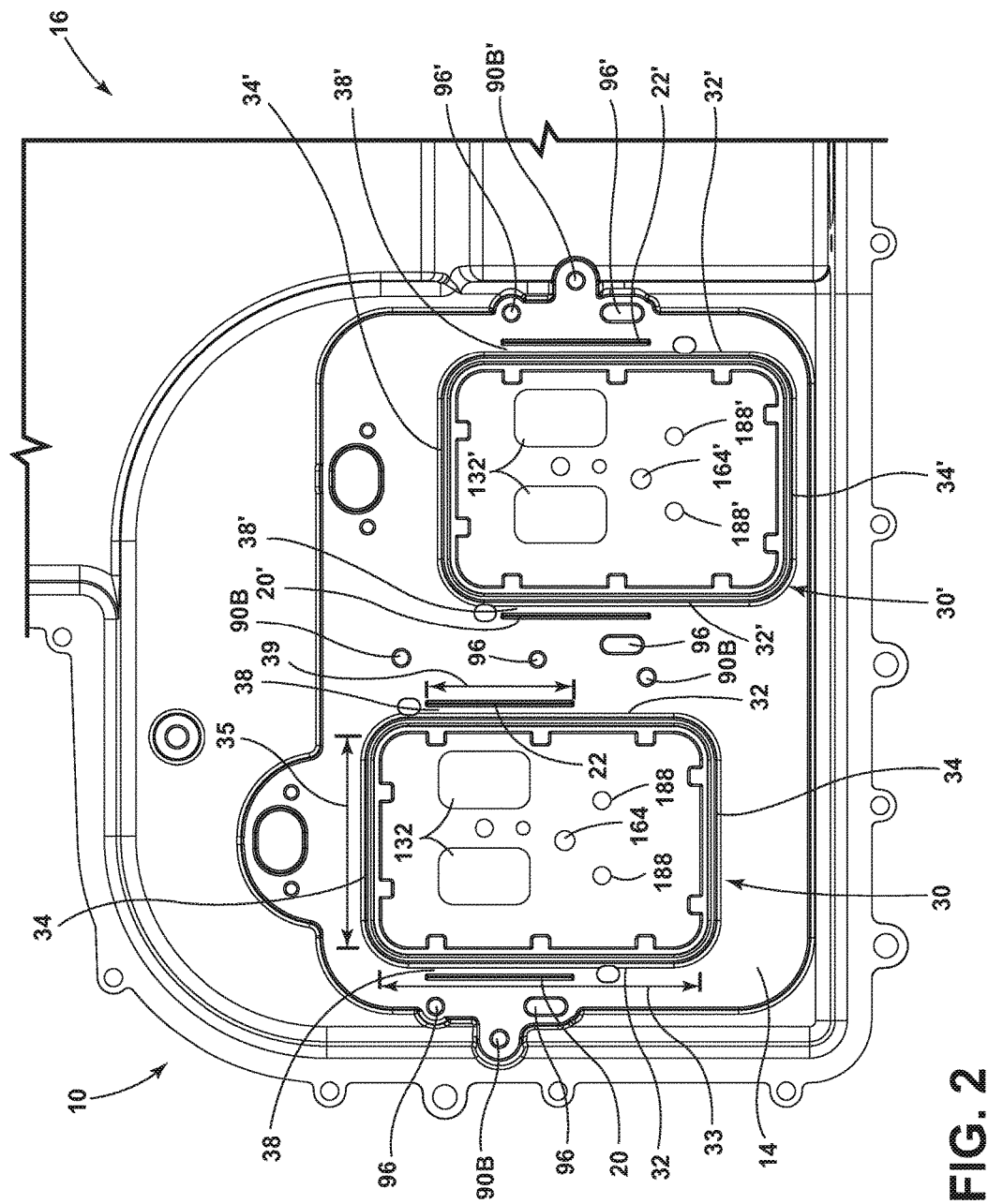
FIG. 2 is a top view generally illustrating portions of an embodiment of a housing member according to teachings of the present disclosure.

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

In embodiments, such as generally illustrated in FIGS. 1, 2, 3, 4, 5, and 6, an electrical unit 16 may include a housing member 10, a bracket 80, 82, a terminal shroud 180, and/or an electrical connector 130. An electrical unit 16 may include a slider 240. A housing member 10 may include an inner surface 12 and an outer surface 14. The outer surface 14 may be configured for electrical connection, such as with an electrical connector 130 of a vehicle wiring harness. One or more guide tracks or formations 20, 22 may extend in a first direction from an outer surface 14 of the housing member 10. The first direction may be substantially perpendicular to the outer surface 14 of the housing member 10 (e.g., the first direction may be substantially parallel to a vertical direction V). In embodiments, one or more guide tracks 20, 22 may extend along a second direction (e.g., a longitudinal direction L, which may be perpendicular to the first direction) and may include a width 26.

With embodiments, a housing member 10 may include one or more connector formations 30 that may be configured to engage and/or connect with at least a portion of an electrical connector 130. For example and without limitation, a connector formation 30 may extend from the outer surface 14 of the housing member 10. The connector formation 30 may include one or more of a variety of shapes, sizes, and/or configurations. For example and without limitation, a connector formation 30 may include a generally rectangular shape and/or may include a first set of generally parallel wall sections 32 that may be disposed opposite each other. Additionally or alternatively, the connector formation 30 may include a second set of generally parallel wall sections 34 that may be disposed opposite each other and generally perpendicular to the first set of wall sections 32. One of the first set of wall sections 32 and the second set of wall sections 34 may extend substantially in a longitudinal direction L and the other of the first set of wall sections 32 and the second set of wall sections 34 may extend substantially in a transverse direction T. In embodiments, the connector formation 30 may be continuous (e.g. the wall sections may form a continuous loop). The corners of the connector formation 30 may be curved or rounded.

In embodiments, the wall sections 32, 34 may include a height 36 greater than the height 24 of the guide track(s) 20, 22. For example and without limitation, the wall section height 36 may be about double the height 24 of the guide track 20, 22. The guide track(s) 20, 22 may be parallel to one of either the first set of wall sections 32 or the second set of wall sections 34. In embodiments, a guide track 20, 22 the outer surface 14 of the housing member 10, a respective one of the first set of wall sections 32 or the second set of wall sections 34 may define a channel 38 that may open outward (e.g., upward away from the outer surface 14 of housing member 10). The channel 38 may, for example and without limitation, extend along the outer surface 14, such as in a longitudinal direction L. The channel 38 may include a length 39 that may be less than the wall section length 33, 35 or substantially the same as the wall section length 33, 35. In embodiments, the channel 38 may include a width 37 that may be substantially the same as the width 26 of the guide track 20, 22. The channel 38 may be configured to at least partially receive an electrical connector 130.

Figure 3:
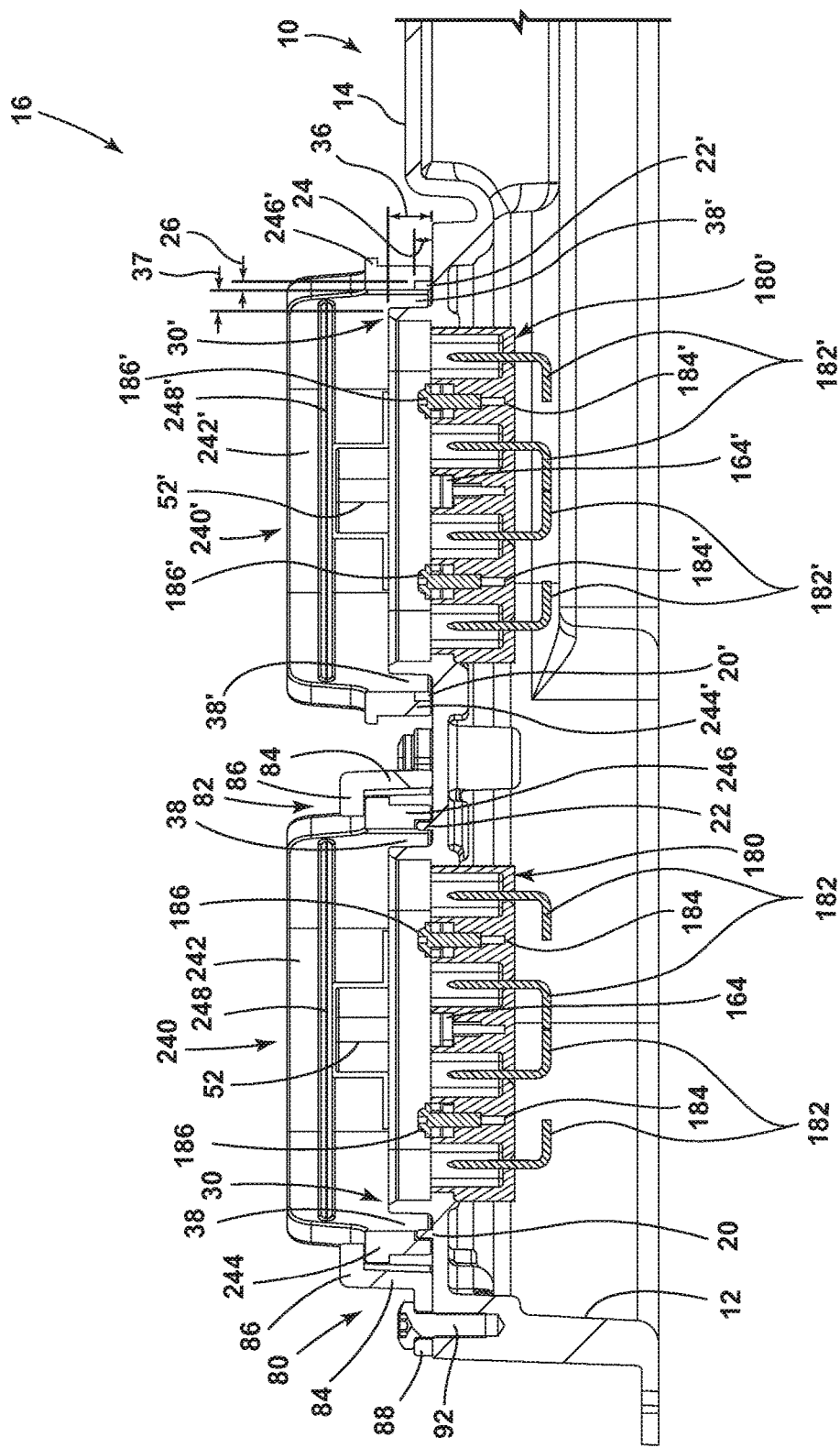
FIG. 3 is a section view generally illustrating portions of an embodiment of an electrical unit according to teachings of the present disclosure.
Figure 4:
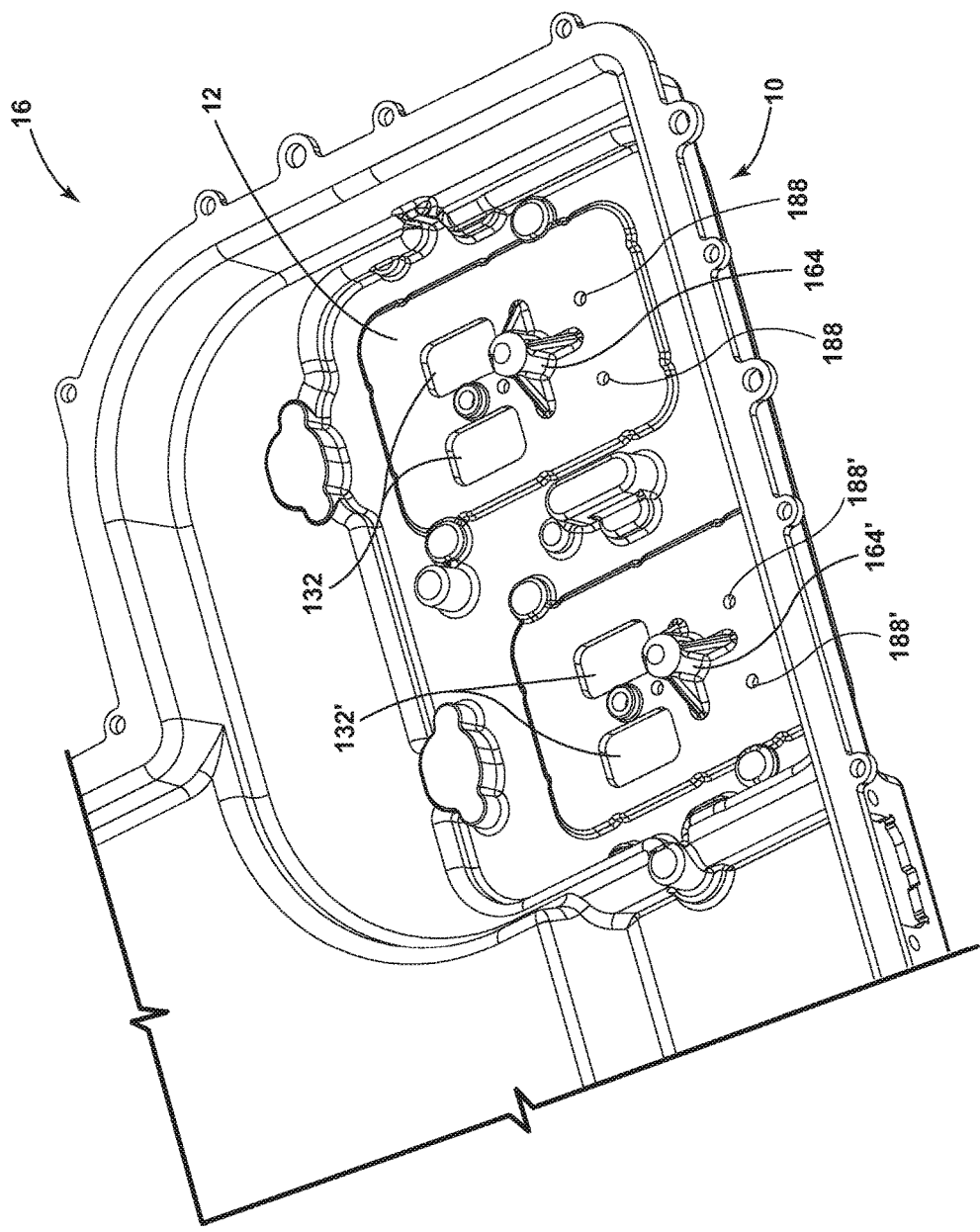
FIG. 4 is a perspective view generally illustrating portions of housing member according to teachings of the present disclosure.
Figure 5:
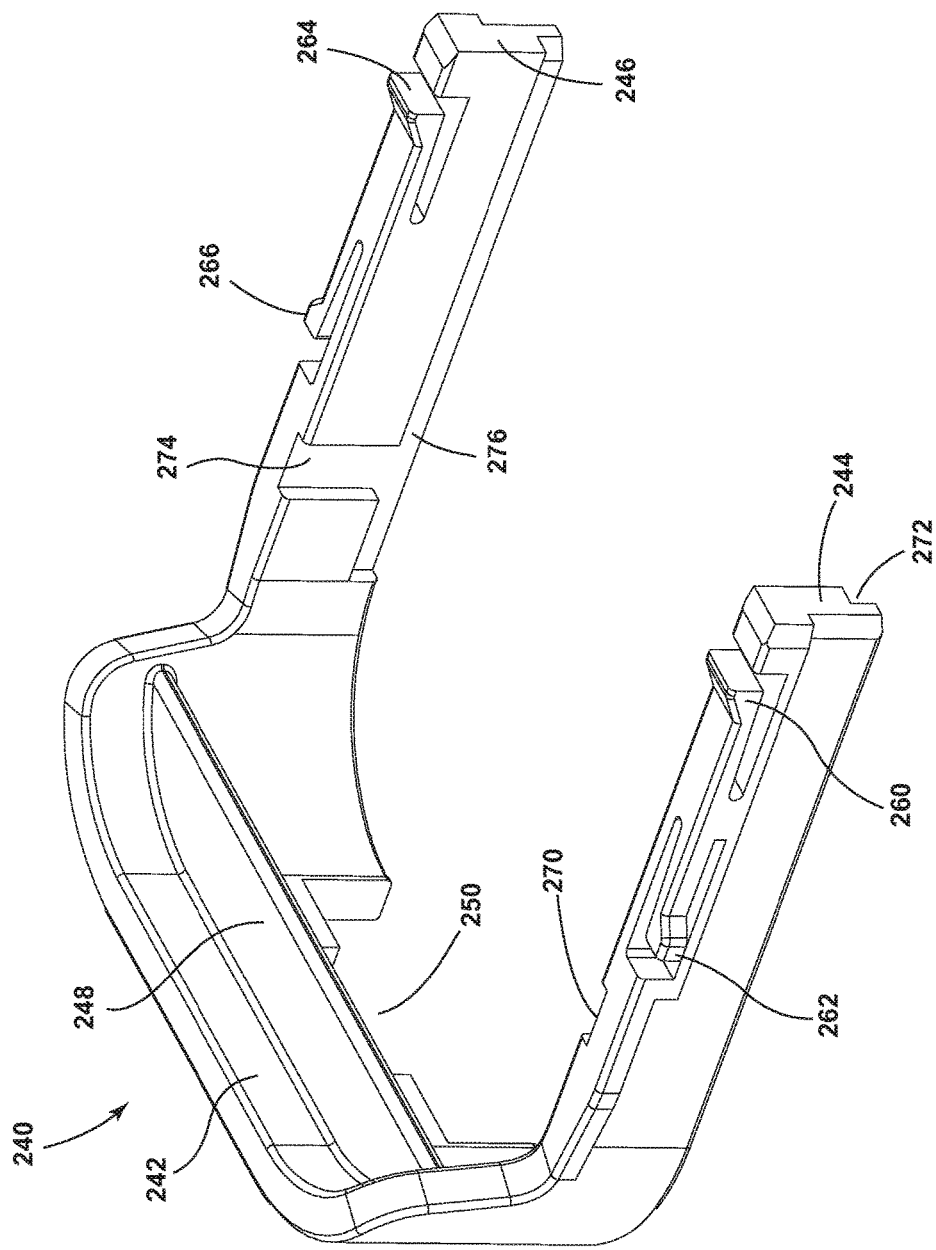
FIG. 5 is a perspective view generally illustrating portions of an embodiment of a slider.
Figure 6:
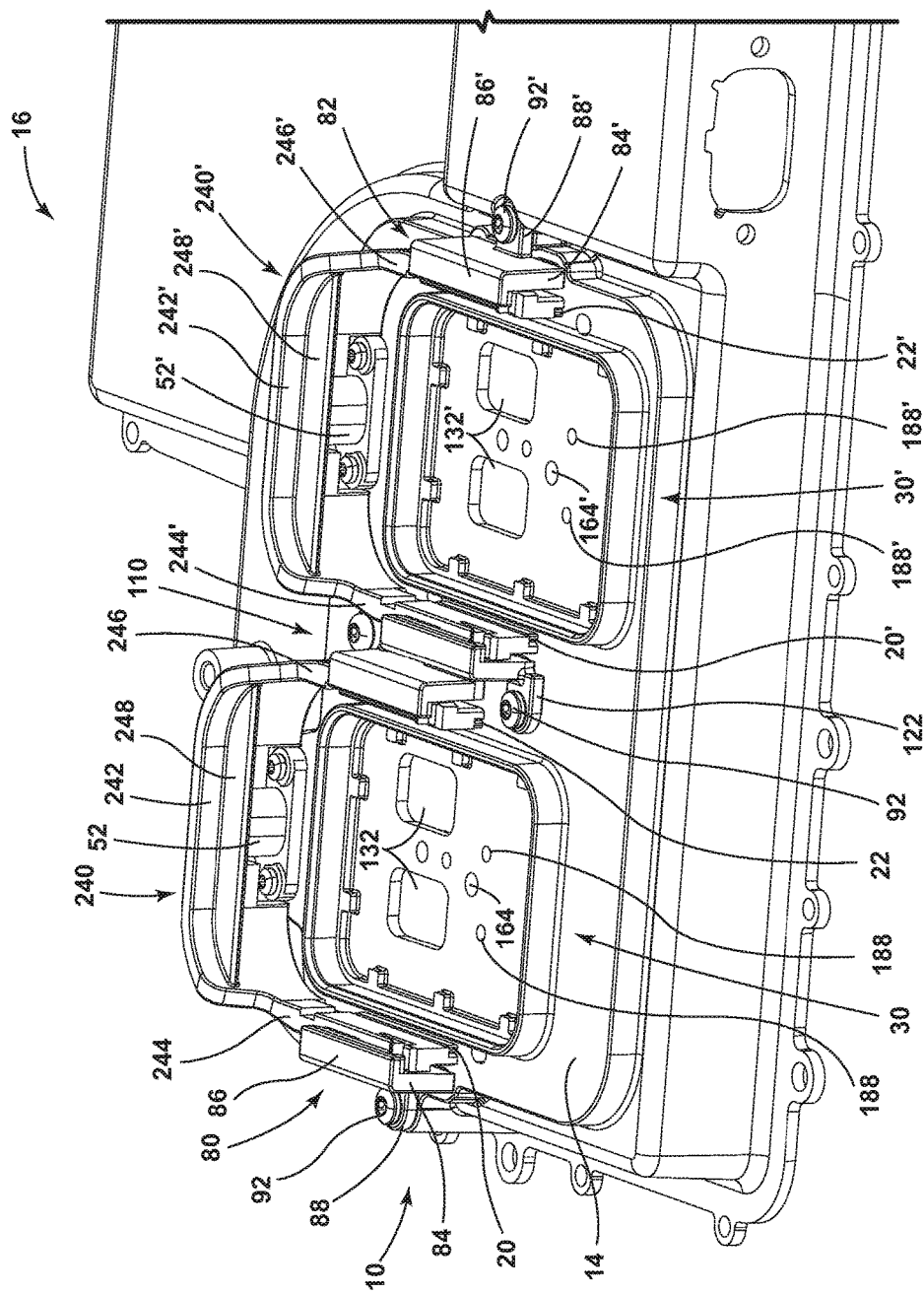
FIG. 6 is a perspective view generally illustrating portions of an embodiment of an electrical unit according to teachings of the present disclosure.
Figure 7B:
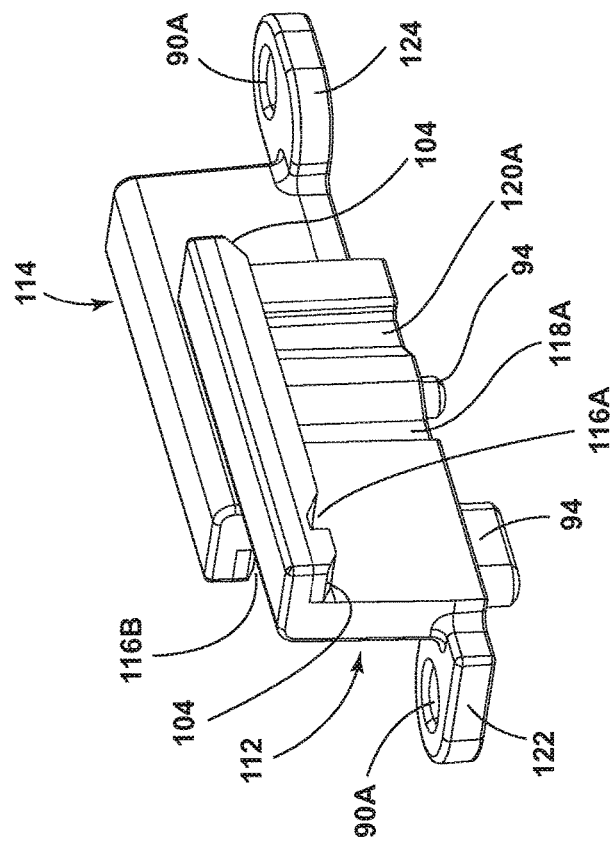
FIG. 7B is a perspective view generally illustrating portions of an embodiment of a bracket according to teachings of the present disclosure.
Figure 7A:
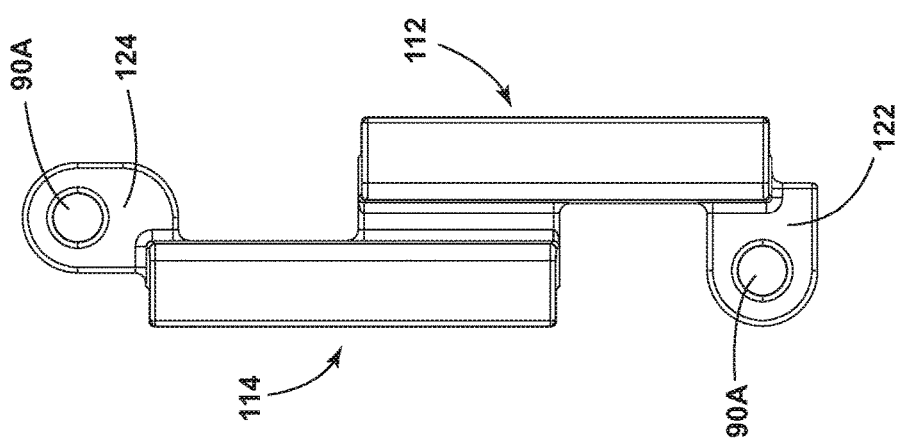
FIG. 7A is a top view generally illustrating portions of an embodiment of a bracket according to teachings of the present disclosure.

In embodiments, such as generally illustrated in FIGS. 3, 5, and 6, a slider 240 may be generally U-shaped. The slider 240 may include a collar 242, a first leg 244, and/or a second leg 246. In embodiments, an inner portion of the collar 242 may include a ridge 248. The ridge 248 may extend from a first side of the collar 242 and may extend to a second side of the collar 242. The ridge 248 may be substantially planar. In embodiments, the collar 242 may be disposed above (e.g., at a greater distance from the outer surface 14 than) the first leg 244 and/or the second leg 246. The collar 242 may include a recess 250. The recess 250 may be configured to partially receive an external connector 52. In embodiments, the recess 250 may be generally the same shape as a profile of the external connector 52.

In embodiments, such as generally illustrated in FIG. 5, the first leg 244 and/or the second leg 246 may extend substantially perpendicular to the collar 242 (e.g., may extend substantially in a longitudinal direction L). The second leg 246 may include a configuration that may be a mirrored version of the configuration of the first leg 244 (e.g., relative a plane extending in the vertical direction V and the longitudinal direction L). The first leg 244 and/or the second leg 246 may include one or more locking features or formations (e.g., flanges 260, 262, 264, 266). For example and without limitation, the first leg 244 may include a first locking flange 260 that flexes in a first direction (e.g. a vertical direction V) and/or a second locking flange 262 that flexes in a second direction (e.g. a transverse direction T). Additionally or alternatively, the second leg 246 may include a first locking flange 264 that flexes in a first direction (e.g. a vertical direction V) and/or a second locking flange 266 that flexes in a second direction (e.g. a transverse direction T). A first locking flange 260, 264 and/or a second locking flange 262, 266 may include a ramped or tapered portion. The first leg 244 and the second leg 246 may or may not be substantially the same length, such as with respect to a longitudinal direction L.

In embodiments, the first leg 244 and/or the second leg 246 may include a first slot 270, 274 disposed at an inner surface of the one or more legs 244, 246. For example and without limitation, the first slot 270, 274 may be substantially vertical. The first slot 270, 274 may be configured to receive a portion of an electrical connector (e.g., electrical connector 130). In embodiments, the first leg 244 and/or the second leg 246 may include a second slot 272, 276 that may extend substantially parallel to the one or more legs 244, 246 (e.g., may extend in a longitudinal direction L). The second slot 272, 276 may be disposed along the inner surface of the slider 240, and the second slot 272, 276 may be connected with the first slot 270, 274, which may provide a generally T-shaped or L-shaped configuration. The first slot 270, 274 and the second slot 272, 276 may be configured to receive a portion of the electrical connector 130.

With embodiments, such as generally illustrated in FIGS. 6, 7A, 7B, 7C, and 7D, an electrical unit 16 may include one or more brackets 80, 82. A bracket may, for example and without limitation, be substantially L-shaped and/or configured to retain a portion of the slider 240. In embodiments, each connector formation 30 may be associated with a first bracket 80 and/or a second bracket 82. The first bracket 80 may be configured to engage the first leg 244 and/or the second bracket 82 may be configured to engage the second leg 246. For example and without limitation, the bracket 80, 82 may include a substantially vertical portion 84 and/or a substantially horizontal portion 86. The vertical portion 84 may be disposed at least partially in contact with the outer surface 14 of the housing member 10. The horizontal portion 86 may extend from the vertical portion 84 (e.g., from a top of the vertical portion 84) and may be disposed substantially parallel to the housing member outer surface 14.

In embodiments, a bracket 80, 82 may include a securing tab 88 that may be configured to connect the bracket 80, 82 to the outer surface 14 of the housing member 10. The securing tab 88 may extend from a bottom of the bracket 80, 82. A securing tab 88 may, for example and without limitation, be disposed generally at or about a middle of the bracket 80, 82 or may be disposed generally towards an end of the bracket 80, 82. A securing tab 88 may include a recess or aperture 90A that may be configured to receive a fastener 92 (e.g., screw, bolt etc.). Securing tab 88 may be configured for alignment with a respective aperture or recess 90B in housing member 10 to connect bracket 80, 82 to housing member 10. Aperture or recess 90B may at least partially receive fastener 92.

In embodiments, a bracket 80, 82 may include a guide protrusion 94 that may be configured to facilitate aligning the bracket 80, 82 with an aperture or recess 96 in the housing member. The guide protrusion 94 may, for example and without limitation, extend (e.g., vertically downward) from a vertical portion of a bracket 80, 82. In embodiments, the guide protrusion 94 may be disposed generally in a middle of the bracket 80, 82 or the guide protrusion 94 may be disposed generally towards an end of the bracket 80, 82. The guide protrusion 94 may include one or more of a variety of shapes. For example and without limitation, the guide protrusion 94 may be substantially elliptic and/or rectangular.

With embodiments, a bracket 80, 82 may include a first notch 98 in the substantially horizontal portion 86. The first notch 98 may be configured to receive at least a portion of the first locking flange 260, 264 of the slider 240. For example and without limitation, the first notch 98 may be disposed in an underside of the substantially horizontal portion 86 of the bracket. In embodiments, the bracket 80, 82 may include a second notch 100 and/or a third notch 102 disposed in a side of the substantially vertical portion 84 of the bracket. The second notch 100 and/or the third notch 102 may be configured to receive at least a portion of the second locking flange 262, 266 of the slider 240. In embodiments, the horizontal portion of a bracket 80, 82 may include one or more ramped or tapered portions 104 that may be disposed at one or more ends of the horizontal portion 86, such as to facilitate insertion of the slider 240 at least partially under the horizontal portion 86 of the bracket 80, 82. A bracket 280, 282 may include a first notch 98, 98' a second notch 100, 100', a third notch 102, 102' and/or one or more ramped or tapered portions 104.

In embodiments, such as generally illustrated in FIGS. 1, 2, 3, 4, and 6, an electrical unit 16 may be configured for connection with one or more electrical connectors 130. For example and without limitation, an electrical unit 16 may include two or more connector formations (e.g., a first connector formation 30 and a second connector formation 30'), may include a first slider 240 and a second slider 240', and/or may include one or more brackets 80, 82 for each connector formation 30, 30'. A second connector formation 30' may be configured in a manner similar to that of the first connector formation 30 and/or components or features of the second connector formation 30' may be similar to components of the first connector formation 30 (e.g., components denoted with a prime annotation may correspond to components without a prime annotation and may be similar). For example and without limitation, a second connector formation 30' may include a slider 240', which may include a first leg 244', a second leg 246', a ridge 248', and a recess 250', and/or the second connector formation 30' an external connector 52'. A second bracket 82 may be configured to connect slider 240' with a second connector formation 30'. A second bracket 82 may include a vertical portion 84', a horizontal portion 86', a securing tab 88', a recess or aperture 90A', a guide protrusion 94', a first notch 98', a second notch 100', and/or a third notch 102'. A fastener 92' may connect the second bracket 82 with the housing member 10. A second connector formation 30' may include the same or a similar shape (e.g., a substantially common shape) as the first connector formation 30.

With embodiments, an electrical unit 16 may include a double bracket 110. A double bracket 110 may, for example and without limitation, be configured to provide the same or similar functionality as two individual brackets 80, 82 and/or may be configured to connect a first slider 240 with a first connector formation 30 and configured to connected a second slider 240' with a second connector formation 30'. A double bracket 110 may include a first bracket section 112 and/or a second bracket section 114. The first bracket section 112 and the second bracket section 114 may be connected to each other. In embodiments, the first bracket section 112 and the second bracket section 114 of the double bracket 110 may or may not be offset. For example and without limitation, the first bracket section 112 and the second bracket section 114 may be offset in a lateral direction L and/or a transverse direction T from each other. The first bracket section 112 may be configured in the same or a similar manner as a first bracket 80 and/or the second bracket section 114 may be configured in the same or a similar manner as a second bracket 82. For example and without limitation, the first bracket section 112 may include notches 116A, 118A, 120A that may be configured in the same or a similar manner as notches 98, 100, 102 of second bracket 82. Additionally or alternatively, the second bracket section 114 may include notches 116B, 118B, 120B that may be configured in the same or a similar manner as notches 98', 100', 102' of the second bracket 82. In embodiments, the double bracket 110 may include a first securing tab 122 and a second securing tab 124. The first securing tab 122 and the second securing tab 124 may extend from opposite ends of the double bracket 110. For example and without limitation, the first securing tab 122 may extend in a transverse direction T from a first end, and the second securing tab 124 may extend in a longitudinal direction L from a second end. A double bracket 110 may be configured to receive a second leg 246 of a first slider 240 and a first leg 244' of a second slider 240'. In embodiments, a double bracket 110 may be provided and/or formed as a single, unitary, and/or monolithic component. For example and without limitation, a connecting portion 110A may connect the first bracket section 112 with the second bracket section 114, and the first bracket section 112, the second bracket section 114, the first securing tab 122, the second securing tab 124, and the connecting portion may be formed as a monolithic component.

With embodiments, such as generally illustrated in FIGS. 8, 8A, 8B, 9, 10A, 10B, 11A, and 11B, an electrical assembly 18 may include an electrical unit 16 and/or an electrical connector 130 that may be configured for connection with the electrical unit 16, the housing member 10, the connector formation 30, the slider 240, and/or the bracket 80, 82. In embodiments, a portion of the electrical connector 130 may be configured to be received by a housing member recess or aperture 132. The electrical connector 130 may be connected to and/or included with a wiring harness, such as a vehicle wiring harness.

In embodiments, the electrical connector 130 may include a first projection 134A and/or a third projection 136A configured to align the electrical connector 130 with the housing member 10. The housing member 10 may include an aligning recess or aperture 140 to at least partially receive the first projection 134A and/or the third projection 136A. The first projection 134A and/or the third projection 136A may, for example and without limitation, extend (e.g., vertically downward) from a bottom or edge portion of the electrical connector 130. In embodiments, the electrical connector 130 may include a second projection 134B and/or a fourth projection 136B that may be configured to be received by a first slot 270, 274 and/or a second slot 272, 276 of a slider 240. The second projection 134B and/or the fourth projection 136B may, for example and without limitation, extend (e.g., in a transverse direction T and/or a vertical direction V) from a bottom or edge portion of the electrical connector 130.

Figure 8A:
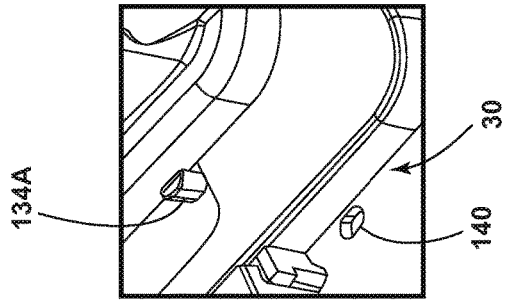
FIG. 8A is an enlarged perspective view generally illustrating portions of embodiments of an electrical unit and a connector according to teachings of the present disclosure.
Figure 8:
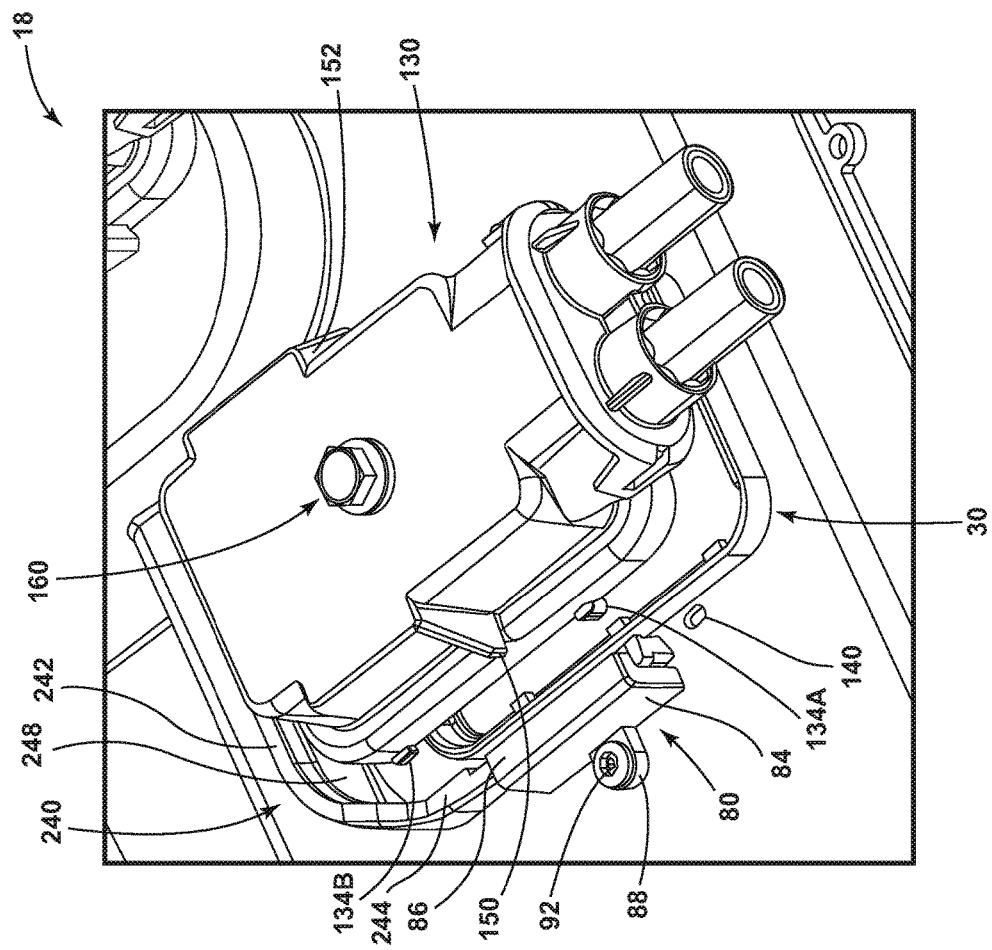
FIG. 8 is a perspective view generally illustrating portions of embodiments of an electrical unit and a connector according to teachings of the present disclosure.
Figure 8B:
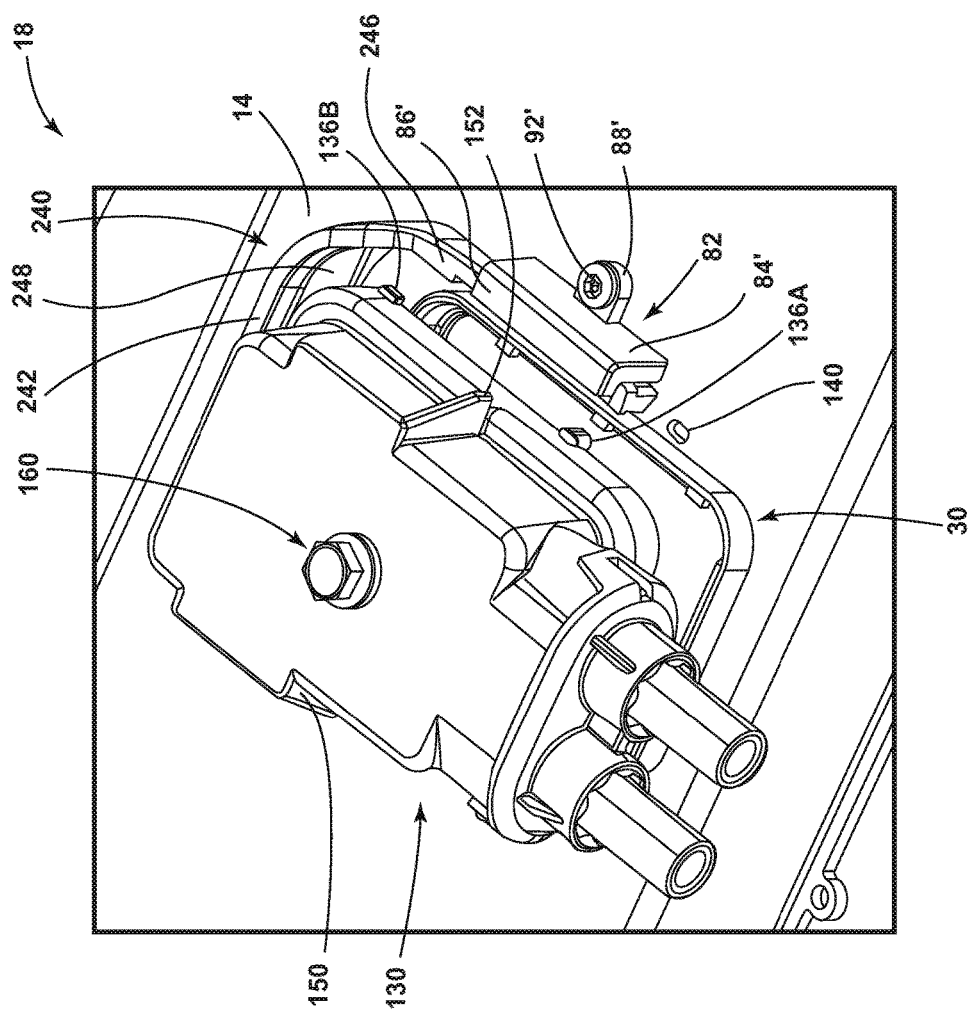
FIG. 8B is a perspective view generally illustrating portions of embodiments of an electrical unit and a connector according to teachings of the present disclosure.

With embodiments, such as generally illustrated in FIGS. 8, 8A, and 8B, an electrical unit 16 may be configured for connection with an electrical connector 130. In an unlocked position of the slider 240, the slider 240 may be at least partially engaged with one or more brackets 80, 82, 110. Connecting an electrical connector 130 with an electrical unit 16 may include inserting the electrical connector 130 at least be partially into a channel 38 and/or disposing the electrical connector 130 in contact the outer surface 14 of the housing member 10. Connecting the electrical connector 130 with the electrical unit 16 may include inserting the first projection 134A of the electrical connector 130 at least partially into an aligning recess or aperture 140 of the housing member 10. Connecting the electrical connector 130 to the electrical unit 16 may include disposing the second projection 134B and/or the fourth projection 136B at least partially in the first slots 270, 274 of the first leg 244 and the second leg 246, respectively.

In embodiments, the electrical connector 130 may include a first wing 150 and/or a second wing 152 that may be configured to engage the slider 240. First wing 150 and second wing 152 may include one or more of a variety of shapes, sizes, and/or configurations. For example and without limitation, the first wing 150 and/or second wing 152 may be ramped or tapered. The wings 150, 152 may extend from opposite sides of the electrical connector 130. In embodiments, the wings 150, 152 may contact the legs 244, 246 of the slider 240. For example and without limitation, if an electrical connector 130 is moved (e.g., downward) toward the housing member 10, the first wing 150 may deflect the first locking flange 260 of the first leg 244 and/or the second wing 152 may deflect the second locking flange 262 of the second leg 246. Deflection of the first locking flange 260 may disengage the first locking flange 260 from a first notch 98 of the first bracket 80 and/or deflection of the first locking flange 264 may disengage the first locking flange 264 from a first notch 98' of the second bracket 82 (or notch 116B of second section 114 of the double bracket 110).

Figure 9:
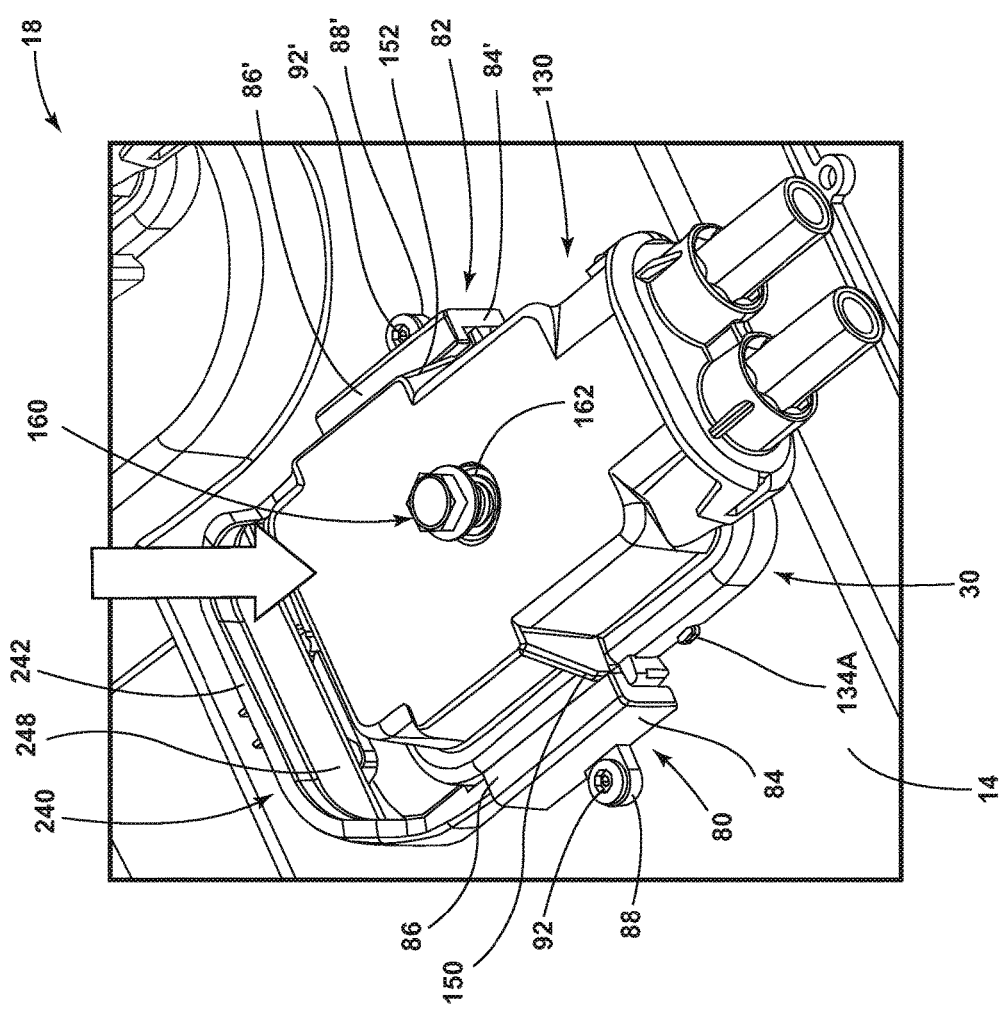
FIG. 9 is a perspective view generally illustrating portions of embodiments of an electrical unit and a connector in an unlocked position according to teachings of the present disclosure.
Figure 10A:
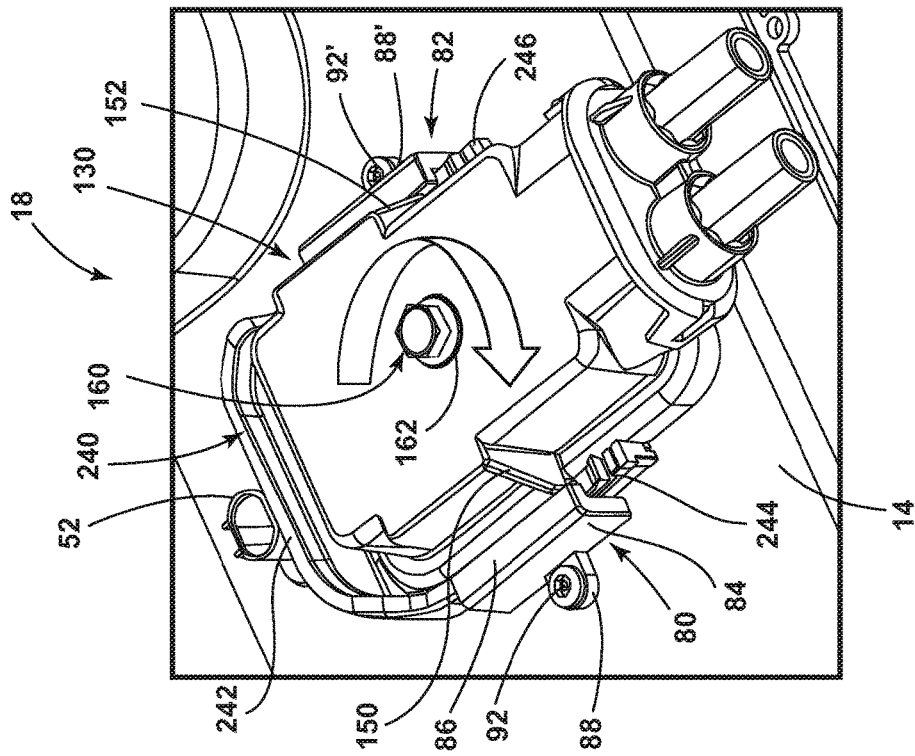
FIG. 10A is a perspective view generally illustrating portions of embodiments of an electrical unit and a connector in a partially locked position according to teachings of the present disclosure.
Figure 10B:
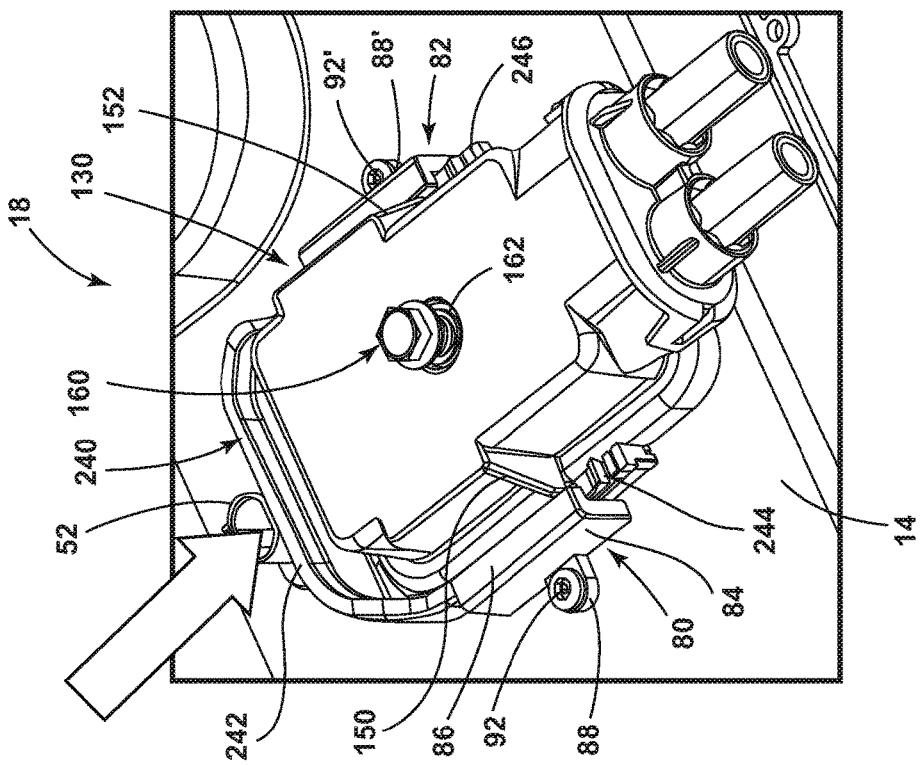
FIG. 10B is a perspective view generally illustrating portions of embodiments of an electrical unit and a connector in a locked position according to teachings of the present disclosure.

As shown in FIGS. 9, 10A, and 10B, if first locking flanges 260, 264 disengage first notches 98, 98', the slider 240 may slide (e.g., in a longitudinal direction L) toward the electrical connector 130. As the slider 240 slides, the second slot 272 of the first leg 244 may receive the second projection 134B of the electrical connector 130 and/or the second slot 276 of the second leg 246 may receive the fourth projection 136B of the electrical connector 130. In embodiments, in an unlocked position of the slider 240, the second locking flange 262 of the first leg 244 may be engaged with a second notch 100 of the first bracket 80 and the second locking flange 266 of the second leg 246 may be engaged with a second notch 100' of the second bracket 82. As the slider 240 slides, the second locking flanges 262, 266 may deflect (e.g., in a transverse direction T) out of engagement with the second notches 100, 100'. If slider 240 continues to slide and reaches a locking position, the second locking flanges 262, 266 may engage (e.g., snap into) the third notches 102, 102' of first bracket 80 and second bracket 82, which may provide a tactile and/or audible indication that the slider 240 is in a locked position.

In embodiments, such as generally illustrated in FIGS. 8-11B, an electrical connector 130 may include a fastener 160 (bolt, screw, etc.) and/or a fastener aperture 162. The fastener 160 may, for example and without limitation, be configured to connect (e.g., secure or fix) the electrical connector 130 to the housing member 10 via a recess or aperture 164 in the housing member 10. The fastener 160 may be disposed substantially at or about a center of the electrical connector 130. In embodiments, fastener 160 may be screwed (e.g., in a clockwise direction) into a recess or aperture 164 of the housing member 10 to connect the electrical connector 130 to the housing member 10.

Figure 11A:
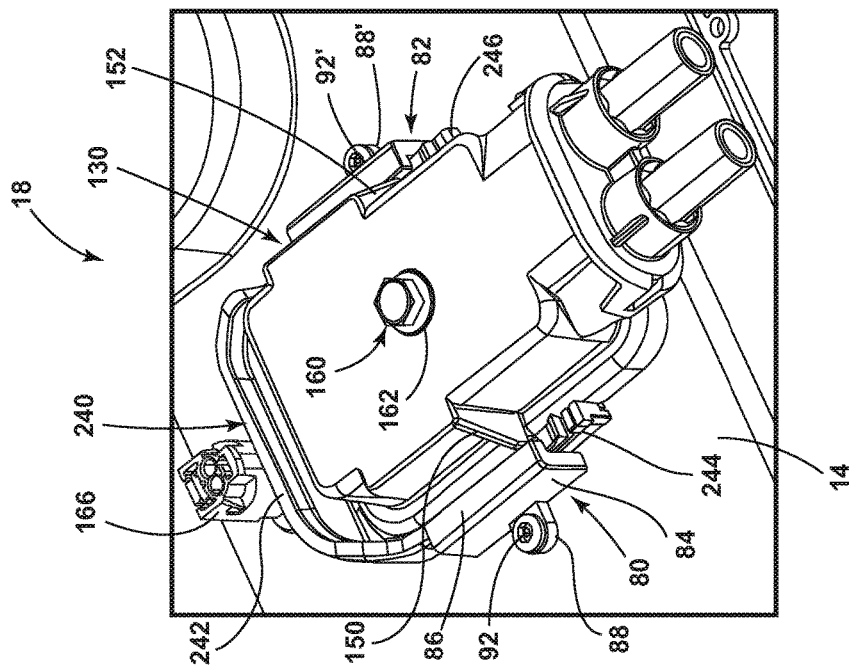
FIG. 11A is a perspective view generally illustrating portions of embodiments of an electrical unit and a connector in a locked position according to teachings of the present disclosure.
Figure 11B:
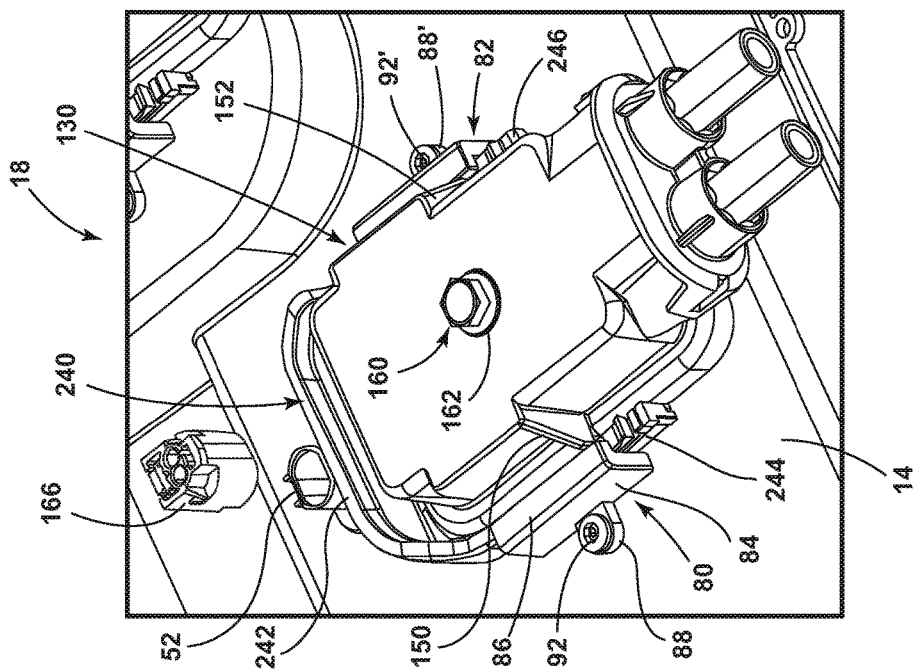
FIG. 11B is a perspective view generally illustrating portions of embodiments of an electrical unit and a connector in a locked position according to teachings of the present disclosure.

As shown in FIGS. 11A and 11B, an electrical unit 16 may include a secondary connector 166 that may be configured for connection with an external connector 52. The secondary connector 166 may, for example and without limitation, be a HVIL (High Voltage Interlock Loop) connector. In an unlocked position of the slider 240, the slider 240 may prevent connecting the external connector 52 with the secondary connector 166 and/in a locked position of the slider 240, the slider 240 may not prevent connecting the external connector 52 with the secondary connector 166. Connection of the secondary connector 166 with the external connector 52 may be part of an HVIL. While the external connector 52 is connected with the secondary connector 166, the external connector 52 may physically prevent the slider 240 from moving from a locked position to an unlocked position, which may prevent disengagement or disconnection of the electrical connector 130 from the electrical unit 16.

Referring again to FIG. 3, in embodiments, an electrical unit 16 may include a terminal shroud 180 that may be configured to connect (e.g., physically) a plurality of electrical terminals 182 to the housing member 10, such as for electrical connection with an electrical connector 130. For example and without limitation, the terminal shroud 180 may be connected to an inner surface 12 of the housing member 10. The housing member 10 may include an aperture or recess 188 that may at least partially receive a fastener 186. The fastener 186 may extend through the housing member aperture or recess 188 and extend at least partially into a terminal shroud aperture or recess 184. In embodiments, the terminal shroud 180 may support the plurality of electrical terminals 182 for electrical connection with the electrical connector 130. An electrical unit 16 may include an aperture 164', a terminal shroud 180', electrical terminals 182', housing member apertures or recesses 188', and/or terminal shroud fasteners 186' that may be associated with a second connector formation 30'. A terminal shroud 180' may include one or more terminal shroud apertures 184'.

Figure 12:
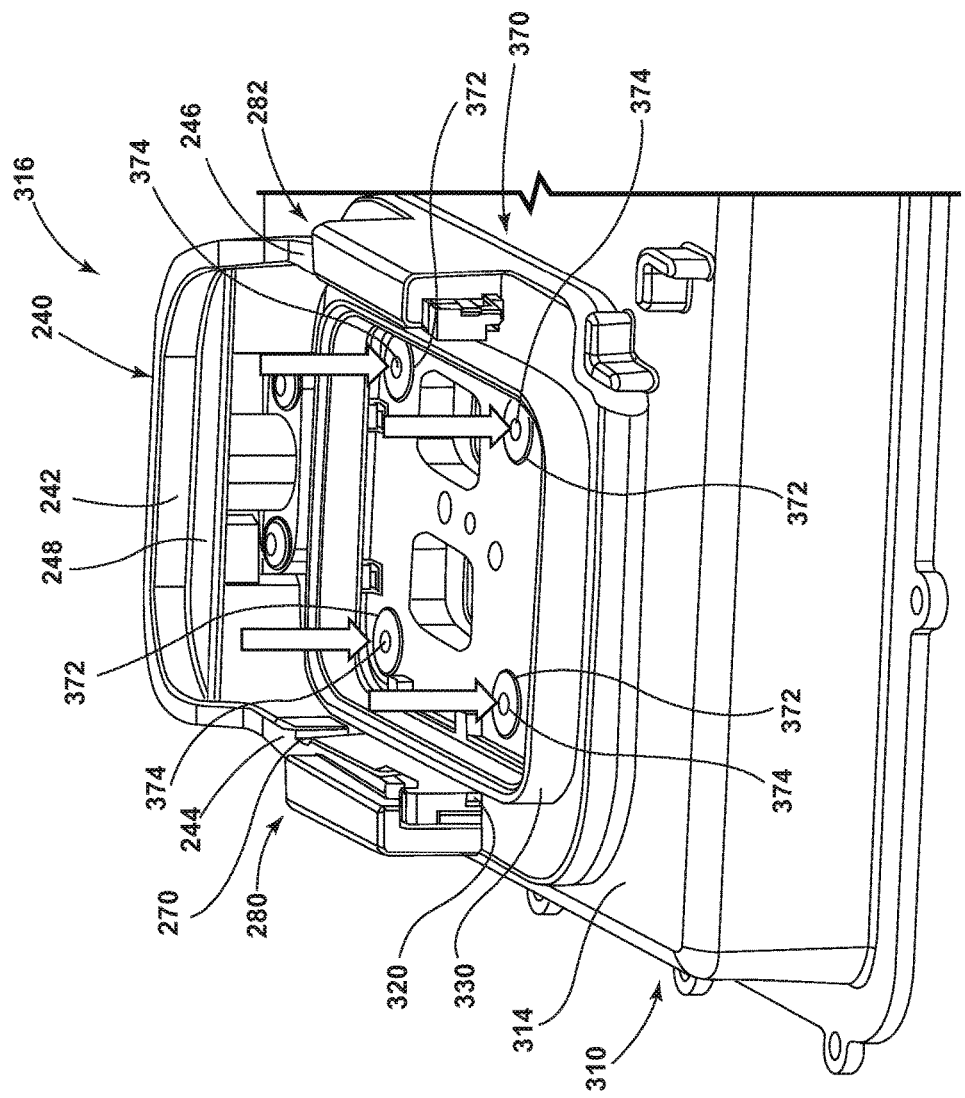
FIG. 12 is a perspective view generally illustrating an embodiment of an electrical unit.

As shown in FIG. 12, an electrical unit 316 may include a header 370. In embodiments, a bracket 280, 282, a connector formation 330, and/or guide track 320 may be formed in the header 370. The header 370 may be connected to the housing member 310. The housing member 310 may include an outer surface 314. For example and without limitation, the header 370 may include one or more apertures 372 to connect the header 370 to the housing member 310, such as via one or more fasteners 374 (e.g., screw, bolt, etc.). In embodiments, the header 370 may be formed as a single, monolithic component.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

What is claimed is:

1. An electrical unit, comprising:
   a housing member;

a slider configured to slide along an outer surface of the housing member and selectively retain an electrical connector relative to the housing member; and a bracket fixed to the housing member, the bracket restricting movement of the slider in at least one direction;

wherein the bracket includes a protrusion; the housing member includes a bracket recess; the bracket includes a securing tab and is fixed to the housing member via the securing tab; and the protrusion is disposed at least partially in the bracket recess.

2. The electrical unit of claim 1, wherein the slider includes a collar and two legs, wherein the legs extend substantially perpendicularly from the collar.

3. The electrical unit of claim 1, including a second bracket, wherein the housing member includes a second bracket recess; the second bracket includes a second protrusion; and the second protrusion is disposed at least partially in the second bracket recess.

4. The electrical unit of claim 1, wherein the housing member includes a guide track.

5. The electrical unit of claim 4, wherein the guide track extends from the outer surface of the housing member substantially parallel to a leg of the slider.

6. The electrical unit of claim 5, wherein the bracket is configured to restrict movement of the slider, and the leg of the slider is in contact with both of the guide track and the outer surface of the housing member.

7. The electrical unit of claim 4, wherein a leg of the slider includes a slot or recess and at least a portion of the guide track is disposed in the slot or recess.

8. The electrical unit of claim 1, wherein the housing member includes a connector formation extending from the outer surface; and the connector formation is configured to engage at least a portion of said electrical connector.

9. The electrical unit of claim 8, wherein the housing member includes a guide track extending from the outer surface; and the connector formation and the guide track define a channel configured to at least partially receive the electrical connector.

10. A method of assembling the electrical unit of claim 1, including providing the housing member, the bracket, and the slider;

fixing the bracket to the housing member;

slidably fixing the slider to the housing member via the bracket; and connecting said electrical connector after slidably fixing the slider to the housing member.

11. The electrical unit of claim 1, including:

a first connector formation extending from the outer surface of the housing member and configured to engage said electrical connector;

a second slider configured to slide along the outer surface of the housing member and selectively retain a second electrical connector relative to the housing member; and a second bracket connected to the housing member, the bracket restricting movement of the second slider in at least one direction; and a second connector formation extending from the outer surface of the housing member and configured to engage said second electrical connector;

wherein the first connector formation and the second connector formation include a substantially common shape, and the first connector formation and the second connector formation are offset in a first direction and offset in a second direction.

12. An electrical unit, comprising:

a housing member;

a slider configured to slide along an outer surface of the housing member and selectively retain an electrical connector relative to the housing member; and a bracket fixed to the housing member, the bracket restricting movement of the slider in at least one direction;

wherein the bracket includes a protrusion; the housing member includes a bracket recess; the protrusion is disposed at least partially in the bracket recess; the slider includes a collar and two legs; the two legs extend substantially perpendicularly from the collar; and the bracket includes a flange configured to engage at least a portion of a leg of the two legs of the slider.

13. The electrical unit of claim 12, wherein the bracket includes a securing tab and is fixed to the housing member via the securing tab.

14. The electrical unit of claim 13, wherein the securing tab includes a recess or aperture.

15. An electrical assembly, comprising:

a housing member;

a first slider;

a second slider;

a bracket fixed to the housing member, the bracket restricting movement of the first slider and the second slider in at least one direction;

an electrical connector connected directly to the housing member via the first slider; and a second electrical connector connected directly to the housing member via the second slider;

wherein the bracket includes a securing tab and a protrusion, the housing member includes a bracket aperture or recess, and at least a portion of the protrusion is disposed in the bracket aperture or recess.

16. The electrical assembly of claim 15, wherein the bracket includes a first bracket portion configured to restrict movement of the first slider and a second bracket portion configured to restrict movement of the second slider; the bracket is formed as a monolithic component; and the first bracket portion is offset from the second bracket portion in two directions.

17. The electrical assembly of claim 15, wherein the housing member includes a guide formation and a connector formation; the guide formation and the connector formation define a channel; and the electrical connector is disposed at least partially in the channel.

18. The electrical assembly of claim 15, wherein an outer surface of the housing member includes a connector recess and at least a portion of the electrical connector is disposed in the connector recess.

19. The electrical assembly of claim 15, including a fastener; wherein the electrical connector includes a connector aperture; the housing member includes a housing member aperture or recess; and the fastener is disposed at least partially in the connector aperture and in the housing member aperture or recess.

* * * * *